United States Patent [19]

Conti

[11] 4,254,751
[45] Mar. 10, 1981

[54] DIESEL ENGINES

[75] Inventor: Luigi Conti, Turin, Italy

[73] Assignee: Centro Ricerche Fiat S.p.A., Orbassano, Italy

[21] Appl. No.: 44,744

[22] Filed: Jun. 1, 1979

[30] Foreign Application Priority Data

Jul. 27, 1978 [IT] Italy .............................. 68789 A/78

[51] Int. Cl.³ .............................................. F02B 3/00
[52] U.S. Cl. ..................................... 123/281; 123/261
[58] Field of Search ............. 123/32 C, 32 D, 32 SP, 123/281, 261

[56] References Cited

U.S. PATENT DOCUMENTS

| | | | |
|---|---|---|---|
| 2,014,828 | 9/1935 | Wirrer | 123/32 C |
| 2,204,068 | 6/1940 | Chapman | 123/32 C |
| 3,044,454 | 7/1962 | Sutton | 123/32 C |
| 3,965,872 | 6/1976 | Taira | 123/32 C |

FOREIGN PATENT DOCUMENTS

| | | | |
|---|---|---|---|
| 873328 | 7/1949 | Fed. Rep. of Germany | 123/32 C |
| 1120944 | 4/1955 | France | 123/32 C |
| 198488 | 6/1938 | Switzerland | 123/32 C |

*Primary Examiner*—Ronald B. Cox
*Attorney, Agent, or Firm*—Sughrue, Rothwell, Mion, Zinn & Macpeak

[57] ABSTRACT

A diesel engine has a transfer duct interconnecting a cylinder and a substantially toroidal precombustion chamber into which projects a fuel injector having four radially arranged, angularly equidistant nozzles, the fuel injector being coaxial with the generation axis of the precombustion chamber which is perpendicular to the axis of the cylinder.

8 Claims, 7 Drawing Figures

DIESEL ENGINES

The present invention relates to diesel engines.

More particularly, the invention is concerned with diesel engines of the type comprising at least one cylinder having an axially slidable piston, a precombustion chamber located externally of the cylinder, a transfer duct interconnecting the cylinder and the precombustion chamber, through which air compressed by sliding of the piston within the cylinder during a compression stroke can flow into the precombustion chamber, and a fuel injector for introducing fuel under pressure into the precombustion chamber during the compression stroke.

It is important in diesel engines of the aforesaid type to ensure turbulent mixing of fuel and air within the precombustion chamber, commonly known as a swirl chamber, and its subsequent flow into the cylinder through the transfer duct, which usually has a small cross-sectional area relative to the swirl chamber.

The high level of turbulence thus generated facilitates correct mixing of the air and fuel, even when the fuel is injected into the precombustion chamber at relatively low injection pressures (typically in the range 150–200 bars) by, for example, a "pintle" type spray nozzle, and, therefore, does not necessitate a high degree of fuel atomisation to produce the required fuel/air mixture.

Thus, in turn, enables the transfer ducts to be designed with a view to optimizing their volumetric efficiency rather than their efficiency in terms of vorticity, as is the case with diesel engines having direct injection of fuel into a combustion chamber formed in the piston crown. Furthermore, relatively simple construction of the injection equipment is ensured. These characteristics are particularly advantageous in the case of diesel engines with a small cylinder capacity, since any inadequacies in the design or construction of the transfer ducts are accentuated in small engines.

Known diesel engines of the aforesaid type do, however, have some disadvantages, including high energy losses due to a pressure drop following the forced passage of air through the transfer duct, and the need to compress the air to a high ratio (typically of the order of 22:1 to 24:1) in an attempt to reduce the ignition delay or lag resulting from the relatively slow mixing and vaporisation rate of the fuel. The ignition lag is greatest when the engine rotation speed is low, for example, during starting and, therefore, a cold start is impossible, even at high ambient temperatures, without the use of preheating glow-plugs.

The object of the present invention is to provide a diesel engine of the above specified type which avoids the above disadvantages, by having a transfer duct with a greater cross-sectional area than the transfer ducts of known diesel engines of this type, thereby appreciably reducing energy losses due to friction during flow of the fuel/air mixture through the ducts and, at the same time, ensuring correct fuel/air mixing within the precombustion chamber.

According to the present invention there is provided a diesel engine of the aforesaid type, characterised in that the precombustion chamber is substantially toroidal in shape, having its generation axis perpendicular to the axis of the cylinder, and in that the injector has an outlet end part provided with a plurality of fuel atomising outlet nozzles communicating with the precombustion chamber, the fuel injector being coaxial with the said generation axis.

With the present diesel engine it is possible, without prejudice to the aforesaid advantages regarding transfer duct design, to use a relatively low compression ratio, becuase the injector nozzles lead to improved atomisation of the fuel and consequently to a reduced ignition lag. It is possible, therefore, to reduce the energy losses due to friction during flow of the fuel/air mixture, thus ensuring a lower fuel consumption, and to cold-start the engine without the use of auxiliary preheating means used in known diesel engines of this type.

The present invention will now be more particularly described, by way of example, with reference to the accompanying diagrammatic drawings, in which.

Figure 1:
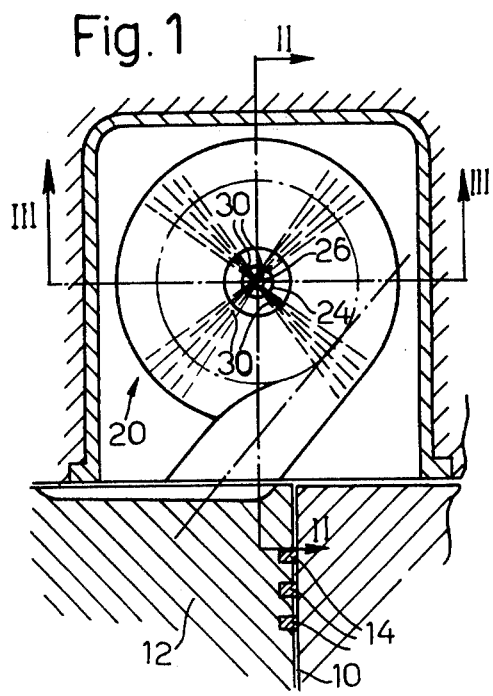
FIG. 1 is a partial section taken on the longitudinal axis of a cylinder of a diesel engine incorporating a precombustion chamber according to one embodiment of the present invention.
Figure 2:
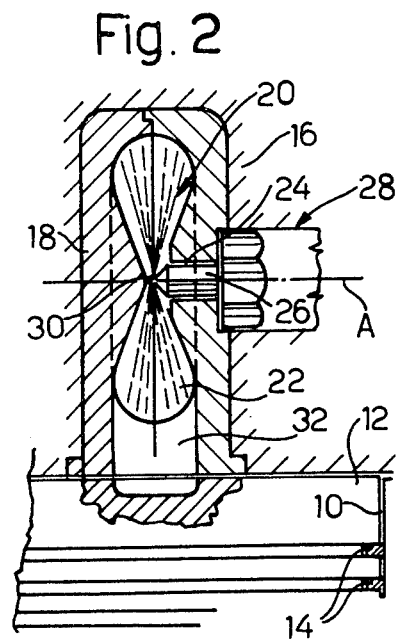
FIG. 2 is a section taken along the line II—II of FIG. 1.
Figure 3:
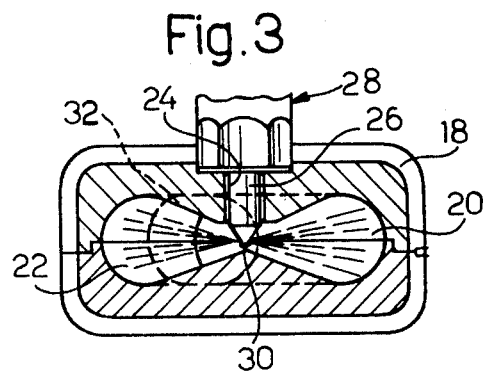
FIG. 3 is a section taken along the line III—III of FIG. 1.

Referring now to FIGS. 1 to 3 of the drawings, there is shown a cylinder 10 of a diesel engine, within which a piston 12 is axially slidable. The piston 12 is provided with sealing rings 14 in the known manner. The cylinder 10 is closed at one end, in this example its upper end, by a cylinder head 16 incorporating a support body 18 within which a precombustion chamber 20 is formed.

The precombustion chamber 20 has a substantially toroidal shape, the generation axis A of which is perpendicular to, and spaced laterally from the axis of the cylinder 10. In the example shown the generatrix of the toroidal chamber 20 comprises a curved line 22 in the form of a lobe which is elongate in a direction perpendicular to the generation axis A.

An outlet end part 26 of a fuel injector 28 projects through the support body 18 and into the precombustion chamber 20 through an aperture 24 which is coaxial with the generation axis A.

The injector outlet end part 26 has four radially arranged, angularly equidistant nozzles 30 which inject sprays of atomised fuel into the precombustion chamber 20 in directions which are substantially perpendicular to the generation axis A. Efficient atomisation is achieved by injecting the fuel at a pressure substantially greater than that previously used in diesel engines of this type.

The precombustion chamber 20 communicates with the upper end of the cylinder 10 through a transfer duct 32 which is arranged with its longitudinal axis perpendicular to the generation axis A and inclined to the axis of the cylinder 10. The transfer duct 32 is arranged such that, at the end of each compression stroke of the piston 12, as shown in FIG. 1, it communicates with a depression 34 formed in the crown of the piston 12. The depression 34 serves as a combustion chamber in which the combustion of the fuel/air mixture, begun in the precombustion chamber 20, is completed.

The transfer duct 32 has a relatively large cross-sectional area, typically of the order of 2.5 to 3 $cm^2$ for an engine with a cylinder capacity of approximately 500 $cm^3$, which during running of the engine, results in the air drawn into the cylinder 10 having a degree of turbulence which is comparable with the optimum turbulence achieved in direct injection diesel engines, that is, those without precombustion chambers. The rotational speed of the vortices of air so obtained is, in fact, usually in the range of 8 to 10 times the speed of rotation of the engine shaft, and turbulence of this degree, when combined with the finely atomised spray of fuel which is produced by the high injection pressure and the increased number of injector nozzles 30, makes it possible to achieve the correct fuel/air mixture within the precombustion chamber 20.

The increased turbulence permits the transfer ducts 32 to be designed with the volumetric efficiency of the engine as the sole consideration.

Furthermore, the relatively large cross-sectional area of the transfer duct 32 ensures an appreciable reduction in the energy losses due to friction during the flow of fuel/air mixture during running of the engine, compared with previous diesel engines of this type.

Moreover, the increased atomisation of the injected fuel, together with the resulting decreased ignition lag, permits the use of relatively low compression ratios, thereby further ensuring a reduction in the energy losses due to friction, as well as permitting cold-starting of the engine without the need for auxiliary preignition devices, such as glow-plugs.

The precombustion chamber 20 may be formed in a variety of geometric forms which differ from that described with reference to FIGS. 1 to 3: some variants are shown in FIGS. 4 to 7.

Figure 4:
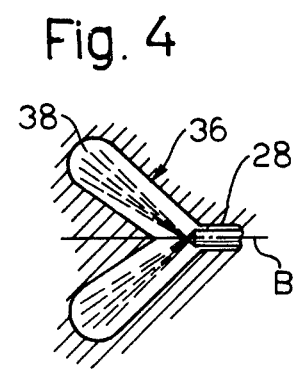
FIGS. 4, 5, 6 and 7 are similar transverse sections, on a reduced scale, of four variants of the precombustion chamber of FIGS. 1 to 3.

FIG. 4 shows a precombustion chamber 36 having a generation axis B and a generatrix comprising a curved line 38 in the form of a lobe, which is elongate in a direction inclined to the generation axis B, the fuel injector 28 being located on the generation axis 3.

Figure 5:
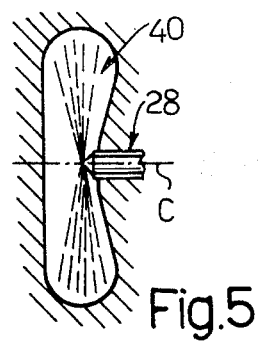

FIG. 5 shows a precombustion chamber 40 in which the wall opposite the fuel injector 28 is planar and is perpendicular to the generation axis C.

Figure 6:
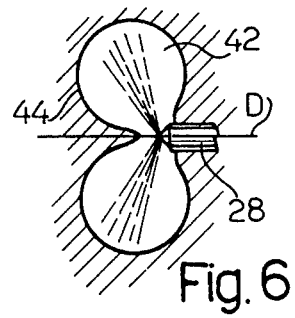

FIG. 6 shows a precombustion chamber 42 having a generation axis D and a generatrix 44 which is part-circular, the generation axis D being substantially tangential to part of the generatrix 44.

Figure 7:
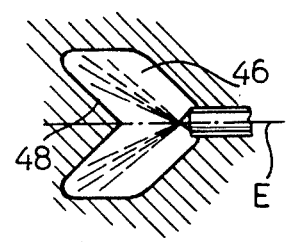

FIG. 7 shows a precombustion chamber 46 in which the generatrix comprises a parallelogram 48 with rounded corners and the generation axis E coincides with one of the shorter sides of the parallelogram 48.

In the various embodiments described above, the atomisation nozzles 30 of the fuel injector 28 are each arranged so as to direct a spray of fuel into those parts of the precombustion chamber which are remote from the generation axis.

What is claimed is:

1. A diesel engine comprising, in combination:
   means defining at least one cylinder,
   a piston axially slidable in said cylinder;
   means defining a precombustion chamber located externally of said cylinder;
   means defining a transfer duct which interconnects said cylinder and said precombustion chamber whereby air compressed by the sliding of said piston in said cylinder during a compression stroke can flow into said precombustion chamber, and
   fuel injector means for introducing fuel under pressure into said precombustion chamber,
   wherein the improvement consists in:
   said precombustion chamber being substantially toroidal in shape, having its generation axis perpendicular to the axis of said cylinder, and
   said fuel injector means having an outlet end part provided with a plurality of fuel atomising nozzles disposed in said precombustion chamber, said fuel injector means being coaxial with said generation axis with said nozzles being disposed substantially radially about said axis.

2. A diesel engine as defined in claim 1, wherein said outlet end part of said fuel injector means has four of said nozzles disposed angularly equidistant with respect to each other.

3. A diesel engine as defined in claim 1, wherein said piston has a crown, and wherein said crown has a depression which, at the end of each said compression stroke, is adjacent the opening of said transfer duct and forms a combustion chamber.

4. A diesel engine as defined in claim 1, wherein said substantially toroidal shape of said precombustion chamber is generated by a generatrix which is intersected by the generation axis at two points spaced along said axis.

5. A diesel engine as defined in claim 4, wherein said generatrix comprises a curved line in the form of a lobe which is elongate in a direction perpendicular to said generation axis.

6. A diesel engine as defined in claim 4, wherein said generatrix comprises a curved line in the form of a lobe which is elongate in a direction inclined to said generation axis.

7. A diesel engine as defined in claim 4, wherein said generatrix in part-circular, said generation axis being substantially tangential to part to said generatrix.

8. A diesel engine as defined in claim 4, wherein said generatrix is substantially in the form of a parallelogram with rounded vertices, said generation axis coinciding with one of its shorter sides.

* * * * *